(12) United States Patent
Bridgen et al.

(10) Patent No.: US 8,898,589 B2
(45) Date of Patent: Nov. 25, 2014

(54) FLATTENING A SUBSET OF CONFIGURATION USER INTERFACE (UI) PANELS IN A HIERARCHY OF UI PANELS

(75) Inventors: Anna Bridgen, Winchester (GB); Andrew Flatt, Winchester (GB); Jonathan Mace, Winchester (GB); Richard Pilot, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 13/173,278

(22) Filed: Jun. 30, 2011

(65) Prior Publication Data

US 2013/0007655 A1 Jan. 3, 2013

(51) Int. Cl.
*G06F 3/048* (2013.01)
*G06F 17/30* (2006.01)
*G06F 9/44* (2006.01)
*G06F 3/01* (2006.01)

(52) U.S. Cl.
CPC .......... *G06F 3/048* (2013.01); *G06F 17/30964* (2013.01); *G06F 9/4443* (2013.01); *G06F 2203/04803* (2013.01); *G06F 17/30946* (2013.01)
USPC ........... 715/789; 715/788; 715/790; 715/791; 715/792

(58) Field of Classification Search
USPC .......................... 715/788, 789, 790, 791, 792
See application file for complete search history.

(56) References Cited

U.S. PATENT DOCUMENTS

| | | |
|---|---|---|
| 6,727,927 B1 | 4/2004 | Dempski et al. |
| 7,412,658 B2 | 8/2008 | Gilboa |
| 2003/0058286 A1* | 3/2003 | Dando ............................ 345/853 |
| 2005/0050471 A1* | 3/2005 | Hallisey et al. ................ 715/734 |
| 2006/0041545 A1 | 2/2006 | Heidloff et al. |
| 2007/0033220 A1* | 2/2007 | Drucker et al. ............ 707/103 R |
| 2007/0094672 A1 | 4/2007 | Hayton et al. |
| 2007/0185826 A1 | 8/2007 | Brice et al. |
| 2007/0288863 A1* | 12/2007 | Ording et al. ................. 715/788 |
| 2009/0006367 A1 | 1/2009 | Jacob et al. |
| 2012/0278756 A1* | 11/2012 | Shah et al. ..................... 715/790 |
| 2013/0125050 A1* | 5/2013 | Goshey .......................... 715/800 |

OTHER PUBLICATIONS

Kersten, "Conquer information overload and ease multitasking," MYLYN 2.0 Tutorial, Part 2, May 6, 2010. http://tasktop.com/mylyn/mylyn-2.0-part2.php.

(Continued)

*Primary Examiner* — Nicholas Augustine
(74) *Attorney, Agent, or Firm* — Steven M. Greenberg, Esq.; CRGO Law

(57) ABSTRACT

Embodiments of the present invention provide a method, system and computer program product for flattening a subset of configuration UI panels in a hierarchy of UI panels. In an embodiment of the invention, a method for flattening a subset of configuration UI panels in a hierarchy of UI panels has been provided. The method includes executing a query against an index of artifacts for which configuration parameter values are receivable in a corresponding panel disposed within a hierarchy of panels of an application. The method additionally includes receiving a result set of artifacts from the index for the query and identifying panels in the hierarchy corresponding to artifacts in the result set. Finally, the method includes displaying a single window in the application with an arrangement of the identified panels. Of note, the method also can include receiving configuration parameter values for the artifacts of the result set through the identified panels in the single window and applying the received configuration parameter values for the artifacts of the result set.

11 Claims, 1 Drawing Sheet

(56) References Cited

OTHER PUBLICATIONS

A Silverlight 4 Drag and Drop File Manager, defwebserver, May 6, 2010. http://www.codeproject.com/KB/silverlight/MVVMFileDragDrop.aspx.

Rational Team Concert 3.0 M8 Milestone, "Support to Run a Query in a Work Item Picker," Aug. 16, 2010. https://jazz.net/downloads/rational-team-concert/milestones/3.0M8?p=n.

Configuring Artifact Dependencies Using Web UI, http://confluence.jetbrains.net/display/TCD6/Artifact+Dependencies, Oct. 13, 2010.

Archive for the 'UI Customization' Category, XML Metadata Extraction for WCM, Dec. 1, 2008. http://blogs.alfresco.com/wp/developer/2013/05/31/metadata-embedding/.

* cited by examiner

FLATTENING A SUBSET OF CONFIGURATION USER INTERFACE (UI) PANELS IN A HIERARCHY OF UI PANELS

BACKGROUND OF THE INVENTION

1. Field of the Invention

The present invention relates to the field of UI management and more particularly to UI configuration panels in a hierarchy of UI panels.

2. Description of the Related Art

The UI is the physical interface through which an end user communicates with an application in a computing environment. The typical function of the UI is to accept input requisite to the operation of the computer program, and to provide a visual indication of output responsive to the user provided input. The UI supports the establishment of configuration parameters controlling the operation of the computer program and its constituent elements whether functional or non-functional, sometimes referred to as artifacts, as it is well known in the art. For simplistic computer programs, only a few (if any) parameters are to be adjusted and therefore no sophisticated UI elements are required to accept and process the user supplied configuration parameters. However, for more complex computer programs, a multitude of configuration parameters are required and a correspondingly more complex arrangement of UI elements is required.

In the circumstance where a complex arrangement of UI elements is required to support the acceptance by an end user of user specific parameters for a computer program, typically one or more dialog boxes, windows, screen portions, collectively referred to as "panels" provide the user interface mechanism for presenting artifacts and accepting configuration of those artifacts. In particular, the configuration of artifacts in a panel can range from accepting manual input by the end user for a configurable characteristic of the artifact, or the panel can present a discrete number of configuration options for the configurable characteristic of the artifact. Oftentimes, the attempt at configuring a characteristic of an artifact in one panel of different configurable artifacts can result in the invocation of a completely separate panel providing additional artifacts able to be configured. Accordingly, a hierarchy of panels of configurable artifacts for a computer program can result.

As it will be understood, establishing a configuration for an artifact within a panel amongst a hierarchy of panels is of no consequence for the advanced user if the configuration is required sporadically and only for a single artifact. However, in the circumstance where configuration changes are required with frequency, or where multiple changes are required for artifacts configurable in different panels at different nodes of the hierarchy, navigating the hierarchy can require expert knowledge of the hierarchy itself by the end user and a degree of patience for the repetitive UI actions required to navigate to each panel.

BRIEF SUMMARY OF THE INVENTION

Embodiments of the present invention address deficiencies of the art in respect to artifact configuration for a computer program through a hierarchy of UI panels and provide a novel and non-obvious method, system and computer program product for flattening a subset of configuration UI panels in a hierarchy of UI panels. In an embodiment of the invention, a method for flattening a subset of configuration UI panels in a hierarchy of UI panels has been provided. The method includes executing a query against an index of artifacts for which configuration parameter values are receivable in a corresponding panel disposed within a hierarchy of panels of an application. The method additionally includes receiving a result set of artifacts from the index for the query and identifying panels in the hierarchy corresponding to artifacts in the result set. Finally, the method includes displaying a single window in the application with an arrangement of the identified panels. Of note, the method also can include receiving configuration parameter values for the artifacts of the result set through the identified panels in the single window and applying the received configuration parameter values for the artifacts of the result set.

In another embodiment of the invention, a flattening data processing system has been provided. The system can include a host computer with at least one processor and memory and an application executing in the host computer. The application can include a hierarchy of panels through which different configuration parameter values are provided for correspondingly different artifacts of the application. The system also can include an index of artifacts that includes different records for corresponding artifacts, each record referencing an artifact, at least one keyword and a reference to a panel through which at least one configuration parameter value can be established for the artifact. Finally, the system includes a flattening module coupled to the application. The flattening module can include program code enabled upon execution in the host computer to execute a query against the index of artifacts, to receive a result set of artifacts from the index for the query, to identify panels in the hierarchy of panels corresponding to artifacts in the result set, and to display a single window in the application with an arrangement of the identified panels.

In one aspect of the embodiment, the program code is further enabled to receive configuration parameter values for the artifacts of the result set through the identified panels in the single window and to apply the received configuration parameter values for the artifacts of the result set. In another aspect of the embodiment, the query includes query terms incorporating wildcard values.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for flattening a subset of configuration UI panels in a hierarchy of UI panels. In accordance with an embodiment of the invention, a search index (also referred to herein as an artifact index) can be established for configurable artifacts in a hierarchy of UI panels. The search index can include different keywords associated with the configurable artifacts along with a reference to a corresponding one of the UI panels in the hierarchy with which the corresponding one of the UI panels can be retrieved directly. A search engine can permit searching of the search index and a result set of UI panels responsive to a search performed in the search engine against the search index can result in the retrieval, placement and arrangement of the UI panels of the result set in a single window. Subsequent configuration of artifacts configurable through the UI panels of the result set can be applied to the computer program.

Figure 1:
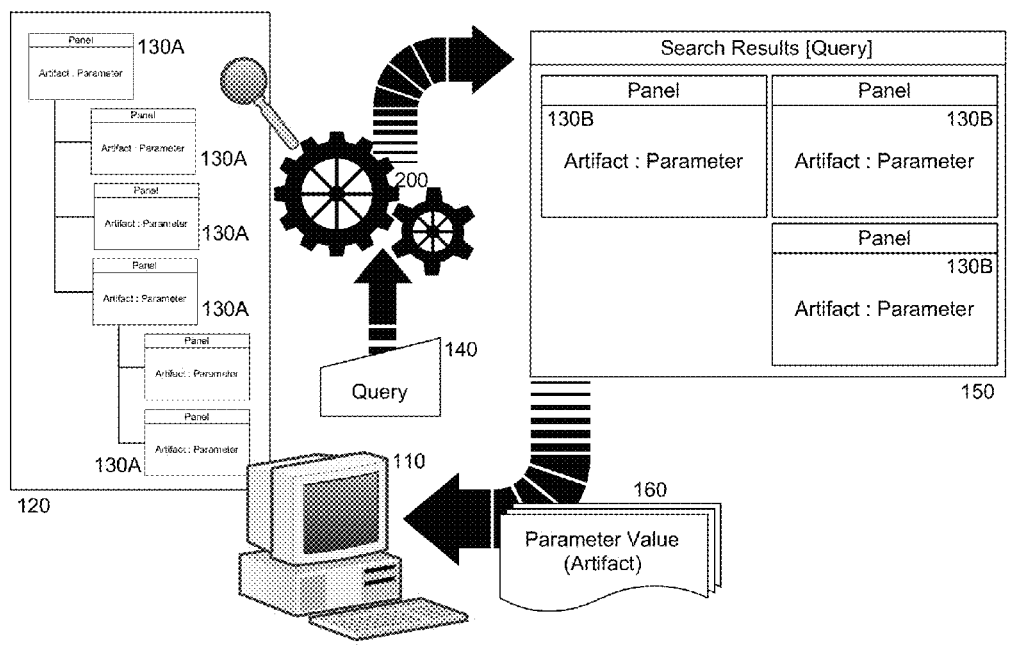
FIG. 1 is a pictorial illustration of a process for flattening a subset of configuration UI panels in a hierarchy of UI panels.

In further illustration, FIG. 1 pictorially shows a process for flattening a subset of configuration UI panels in a hierarchy of UI panels. As shown in FIG. 1, a hierarchy 120 of panels 130A for setting configuration parameter values for artifacts of an application 110 can be indexed according to different keywords for each of the artifacts. A flattening data processing system 200 can receive a query 140 of terms for artifacts and can locate within the index a result set of artifacts and corresponding panels 130B in which configuration parameter values can be established for the artifacts. In this regard, the query can be a traditional boolean query, a natural language processing query, or a partial query utilizing wildcard values. Thereafter, the corresponding panels 130B for the result set of artifacts can be arranged in a single window 150 and configuration parameter values 160 can be received there through. Finally, the configuration parameter values 160 can be stored in connection with the application 110.

Figure 2:
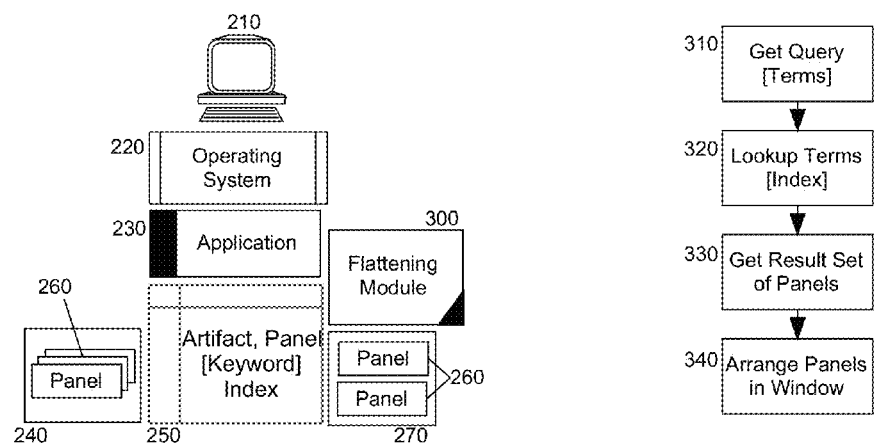
FIG. 2 is a schematic illustration of a flattening data processing system configured for flattening a subset of configuration UI panels in a hierarchy of UI panels; and, FIG. 3 is a flow chart illustrating a process for flattening a subset of configuration UI panels in a hierarchy of UI panels.

The process described in connection with FIG. 1 can be implemented in a flattening data processing system. In yet further illustration, FIG. 2 schematically shows a flattening data processing system configured for flattening a subset of configuration UI panels in a hierarchy of UI panels. The system can include a host computer 210 with at least one processor and memory. The host computer 210 can support the execution of an operating system 220 which in turn can host the operation of an application 230. The application 230 can operate according to different configuration parameter values for different artifacts of the application 230, such as UI display preferences, security preferences, resource location preferences, and the like. The application 230 further can provide a hierarchy 240 of configuration UI panels 260 through which the configuration parameter values can be received from an end user and set for the application 230.

Of note, an artifact index 250 can be provided for configurable artifacts able to be configured through the panels 260 of the hierarchy. The artifact index 250 can include, for example, a table of artifacts, each correlated with different keywords and a panel in which one or more configuration parameter values can be established for the artifact. Importantly, a flattening module 300 can be coupled to the index 250. The flattening module 300 can include program code that when executed by at least one processor of the host computer 210 can conduct query operations against the artifact index 250 to produce result sets of the panels 260 corresponding to artifacts resulting from the queries. The program code of the flattening module 300 further can be enabled to arrange the panels 260 of the result set in a single window 270. In this way, the end user can query the artifact index 250 to quickly locate all panels 260 relevant to a query operation to provide a singular, dynamically constructed UI for providing configuration parameter values to artifacts of interest without requiring the end user to manually navigate the hierarchy 240 of panels 260 for each of the artifacts of interest.

Figure 3:
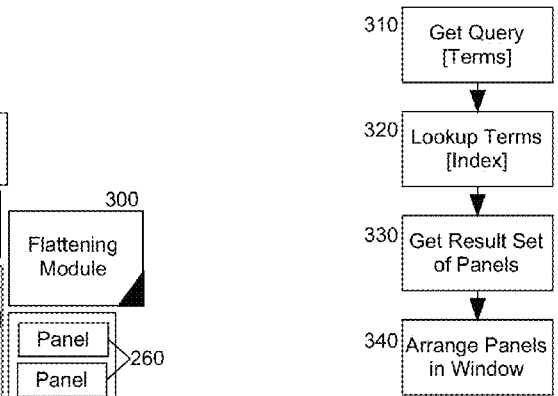

In even yet further illustration of the operation of the flattening module 300, FIG. 3 is a flow chart illustrating a process for flattening a subset of configuration UI panels in a hierarchy of UI panels. Beginning in block 310, a query can be received of different query terms for execution against an artifact index of artifacts of an application for which configuration parameter values can be established through respectively different panels arranged in a hierarchy of panels. In block 320, the query terms can be located within the artifact index. In block 330, a result set of panels corresponding to the located artifacts can be retrieved and arranged in a single window in block 340. Thereafter, configuration parameter values can be received from the end user through the panels in the single window without requiring the end user to individually navigate to each of the panels in the hierarchy of panels in order to provide configuration parameter values for the artifacts.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

1. A method for flattening a subset of configuration user interface (UI) panels in a hierarchy of UI panels, the method comprising:
   establishing a search index of configurable artifacts of an application, wherein configuration parameters for the configurable artifacts are receivable in a hierarchy of UI panels, wherein the search index includes different keywords associated with the configurable artifacts along with a reference to a corresponding one of the UI panels in the hierarchy with which the corresponding one of the UI panels is retrieved directly;
   executing, in a data processing system including a host computer with at least one processor and memory, a query against the search index of the configurable artifacts;
   receiving a result set of artifacts from the search index for the query;
   identifying UI panels in the hierarchy corresponding to artifacts in the result set; and,
   displaying a single window in the application with an arrangement of the identified UI panels.

2. The method of claim 1, further comprising:
   receiving configuration parameter values for the artifacts of the result set through the identified UI panels in the single window; and,
   applying the received configuration parameter values for the artifacts of the result set.

3. The method of claim 1, wherein the query includes query terms incorporating wildcard values.

4. The method of claim 1, wherein the search index of configurable artifacts comprises a set of keywords for each configurable artifact in the search index along with a corresponding UI panel for each configurable artifact through which at least one configuration parameter value is set for the configurable artifact.

5. A flattening data processing system comprising:
a host computer with at least one processor and memory;
an application executing in the host computer, the application comprising a hierarchy of panels through which different configuration parameter values are provided for correspondingly different configurable artifacts of the application;
a search index of artifacts comprising a plurality of records for corresponding artifacts, each record referencing an artifact, at least one keyword and also a reference to a panel through which at least one configuration parameter value is established for the artifact, wherein the panel is retrieved directly with the reference; and,
a flattening module coupled to the application, the flattening module comprising program code enabled upon execution in the host computer to execute a query against the search index of artifacts, to receive a result set of artifacts from the search index for the query, to identify panels in the hierarchy of panels corresponding to artifacts in the result set, and to display a single window in the application with an arrangement of the identified panels.

6. The system of claim 5, wherein the program code is further enabled to receive configuration parameter values for the artifacts of the result set through the identified panels in the single window and to apply the received configuration parameter values for the artifacts of the result set.

7. The system of claim 5, wherein the query includes query terms incorporating wildcard values.

8. A computer program product for flattening a subset of configuration user interface (UI) panels in a hierarchy of UI panels, the computer program product comprising:
a computer readable storage medium having computer readable program code embodied therewith, the computer readable program code comprising:
computer readable program code for establishing a search index of configurable artifacts of an application, wherein configuration parameters for the configurable artifacts are receivable in a hierarchy of UI panels, wherein the search index includes different keywords associated with the configurable artifacts along with a reference to a corresponding one of the UI panels in the hierarchy with which the corresponding one of the UI panels is retrieved directly;
computer readable program code for executing a query against the search index of the configurable artifacts;
computer readable program code for receiving a result set of artifacts from the search index for the query;
computer readable program code for identifying UI panels in the hierarchy corresponding to artifacts in the result set; and,
computer readable program code for displaying a single window in the application with an arrangement of the identified UI panels.

9. The computer program product of claim 8, further comprising:
computer readable program code for receiving configuration parameter values for the artifacts of the result set through the identified UI panels in the single window; and,
computer readable program code for applying the received configuration parameter values for the artifacts of the result set.

10. The computer program product of claim 8, wherein the query includes query terms incorporating wildcard values.

11. The computer program product of claim 8, wherein the search index of configurable artifacts comprises a set of keywords for each configurable artifact in the search index along with a corresponding UI panel for each configurable artifact through which at least one configuration parameter value is set for the configurable artifact.

* * * * *